(12) United States Patent
Kang

(10) Patent No.: US 7,768,618 B2
(45) Date of Patent: Aug. 3, 2010

(54) LIQUID CRYSTAL DISPLAY DEVICE AND FABRICATION METHOD THEREOF

(75) Inventor: Sung-Gu Kang, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 1025 days.

(21) Appl. No.: 11/372,097

(22) Filed: Mar. 10, 2006

(65) Prior Publication Data

US 2007/0146611 A1   Jun. 28, 2007

(30) Foreign Application Priority Data

Dec. 26, 2005 (KR) ............ 10-2005-0130003
Mar. 8, 2006 (KR) ............ 10-2006-0021968

(51) Int. Cl.
*G02F 1/1345* (2006.01)

(52) U.S. Cl. .......... 349/149; 349/151; 349/152; 349/138

(58) Field of Classification Search ......... 349/149–152, 349/139, 147, 138
See application file for complete search history.

(56) References Cited

U.S. PATENT DOCUMENTS

| | | | | | |
|---|---|---|---|---|---|
| 5,835,177 | A | * | 11/1998 | Dohjo et al. | 349/147 |
| 6,147,739 | A | * | 11/2000 | Shibatani | 349/152 |
| 6,937,314 | B2 | * | 8/2005 | Kim | 349/149 |
| 7,626,669 | B2 | * | 12/2009 | Lim et al. | 349/149 |

* cited by examiner

*Primary Examiner*—Thoi V Duong
(74) *Attorney, Agent, or Firm*—Morgan Lewis & Bockius LLP

(57) ABSTRACT

A liquid crystal display device includes a substrate, a plurality of gate lines and a plurality of data lines on the substrate, a first insulation layer on the plurality of the gate lines, a plurality of gate link lines electrically connected to the gate lines, and a plurality of data link lines electrically connected to the data lines, the gate link lines and the data link lines being on the first insulation layer.

8 Claims, 4 Drawing Sheets

LIQUID CRYSTAL DISPLAY DEVICE AND FABRICATION METHOD THEREOF

The present invention claims the benefit of Korean Patent Application Nos. 130003/2005 and 021968/2006 respectively filed in Korea on Dec. 26, 2005 and Mar. 8, 2006, which is hereby incorporated by reference in its entirety.

BACKGROUND OF THE INVENTION

1. Field of the Invention

The present invention relates to a liquid crystal display (LCD) device, and more particularly, relates to a liquid crystal display device and a fabrication method thereof that provide improved electrical contact characteristics for mounting a driving integrated circuit (IC) thereon.

2. Discussion of the Related Art

Recently, as interests in information displays are growing and the demand for portable information devices, e.g., a mobile phone, is increasing, researches and commercialization of lightweight compact flat panel display (FPD) devices are actively ongoing. Among FPD devices, a liquid crystal display device, which employs optical anisotropy of liquid crystal molecules, exhibits excellent resolution and color quality, and has been widely used in small electronic devices, such as mobile terminals, and notebook computers. In general, an LCD device employed for small electronic devices has a different structure from an LCD for a large-scale LCD device.

FIG. 1 is a plan view illustrating an LCD device according to the related art. In FIG. 1, an LCD device includes a substrate 12. The substrate 12 includes an image display region 10 having a plurality of pixels P, a plurality of gate link lines GL1 . . . GLm and a plurality of data link lines 30. Although not shown, a plurality of data lines are arranged in a vertical direction and a plurality of gate lines are arranged in a horizontal direction in the image display region 10. The gate lines and the data lines intersect each other to define the pixels P. The gate lines of the image display region 10 are respectively connected with the gate link lines GL1 . . . GLm, and the data lines are respectively connected with the data link lines 30.

In addition, a driving integrated circuit (IC) 20 is mounted outside the display region 10 and along an edge of the substrate 12. The driving IC 20 applies data signals and scan signals to the pixels P through the gate link lines GL1 . . . GLm and the data link lines 30. Since the LCD device is employed in a small-size electronic device, to maximize the surface area of the image display region 10, regions other than the image display region 10 become narrow or small. Accordingly, a gate driving unit and a data driving unit, which are individually provided in a medium or large LCD device, are formed as a single integrated circuit in a small LCD device.

For example, the driving IC 20 includes a gate driving unit and a data driving unit. In particular, the driving IC 20 includes a plurality of output ports for outputting scan signals and a plurality of output ports for outputting data signals. The output ports for outputting data signals typically are positioned at the central portion, and the output ports for outputting scan signals are positioned at side portions.

Thus, the data link lines 30 electrically connect to the output ports at the central portion of the driving IC 20, and the gate link lines GL1 . . . GLm electrically connect to the output ports at side portions of the driving IC 20. In particular, a first half of the gate link lines GL1 . . . GLm are on a left side portion and a second half of the gate link lines GL1 . . . GLm are on a right side portion. In addition, the first half of the gate link lines GL1 . . . GLm are connected to gate lines located at a upper region of the image display region 10, and the second half of the gate link lines are connected to gate lines located at a lower region of the image display region 10.

A plurality of conductive bumps functioning as terminals for allowing the gate link lines GL1 . . . GLm and the data link lines 30 to electrically contact the driving IC 20 are formed on the substrate 12. Since the output ports for outputting the scan signals and the data signals are in a row in the driving IC 20, the bumps also are disposed in a row.

FIG. 2 is a plan view illustrating connections between a substrate and a driving IC according to the related art, and FIG. 3 is a cross-sectional view along I-I in FIG. 2. In FIG. 2, a plurality of input bumps 140 and a plurality of output bumps 150 are formed on a region of the substrate where the driving IC 120 is mounted. Control signals and data signals are applied to the input bumps 140 from a timing controller of the LCD device, and scan signals and data signals are outputted through the output bumps 150. The output bumps 150 include gate output bumps 151a and 151b for outputting scan signals and data output bumps 152 for outputting data signals. A plurality of input/output terminals are provided on a rear surface of the driving IC 120 electrically connected to the gate output bumps 151a and 151b and the data output bumps 152.

The gate link lines and the data link lines arranged on the substrate are formed simultaneously when a pattern of a liquid crystal display panel is formed on a mother substrate. In particular, the gate link lines are formed simultaneously when the gate lines are formed in every liquid crystal display panel, and the data link lines are formed when the data lines are formed in every liquid crystal display panel. Thus, since the gate link lines and the data link lines are each formed on a different layer, a step height of the gate output bumps 151a and 151b and a step height the data output bumps 152 are different.

As shown in FIG. 3, the liquid crystal display panel includes gate link lines 235 formed on a substrate 212, a gate insulation layer 231 formed on the entire surface of the substrate 212 including the gate link lines 235, and a passivation layer 234 formed on the entire surface of the substrate 212 including data link lines 230 and gate link lines 235. In addition, data bumps 252 are disposed at contact holes 237 formed in the passivation layer 234 and electrically contact the data link lines 230. Gate bumps 251 are disposed at the contact holes 239 formed in the passivation layer 234 and the gate insulation layer 231 and electrically contact the gate link lines 235.

The driving IC 220 is mounted on the substrate 212, and a plurality of input/output terminals 221 are on a rear or lower surface of the driving IC 220. The terminals 221 are electrically connected to the gate bumps 251 and the data bumps 252 through conductive balls 238.

Further, the gate link lines 235 and the data link lines 230 are formed in different layers. In particular, the gate link lines 235 are formed simultaneously when the gate lines are formed on the substrate 212. On the other hand, the data link lines 235 are formed simultaneously when the data lines, drain electrodes and source electrodes are formed on the substrate 212 during a process of forming thin film transistors (TFTs). Accordingly, an active layer 232 is formed between the data link line 230 and the gate insulation layer 231.

Since the data link lines 230 and the gate link lines 235 are in different layers, a step or vertical topographic offset occurs. A step also occurs between the data bumps 252 formed on the data link lines 230 and the gate bumps 251 formed on the gate link lines 235. As a result, the distance d1 between the gate bumps 251 and the input/output terminals 221 and the distance d2 between the data bumps 252 and the input/output terminals 221 are different from each other. More specifically, the distance d1 is greater than the distance d2.

Further, the conductive balls 238 are pressed between the data bumps 252 and the input/output terminals 221 due to the distance d2, but the conductive balls 238 located between the gate bumps 251 and the input/output terminals 221 are not pressed due to the distance d1. Thus, a contact deficiency occurs the between gate bumps 251 and the input/output terminals 221, thereby reducing contact efficiency between the driving IC 220 and the substrate 212. Such contact deficiency interferes with transferring control signals and data signals from the timing controller to the driving IC. Such contact deficiency also interferes with transferring scan signals and data signals from the driving IC to the gate link lines and the data link lines, thereby causing the LCD device to be driven erroneously.

SUMMARY OF THE INVENTION

Accordingly, the present invention is directed to a liquid crystal display device and a fabrication method thereof that substantially obviate one or more problems due to limitations and disadvantages of the related art.

An object of the present invention is to provide a liquid crystal display (LCD) device and a fabrication method thereof that improve contact characteristics for a driving IC thereon.

Another object of the present invention is to provide a liquid crystal display (LCD) device and a fabrication method thereof that prevent a step formation between the gate link lines and the gate lines formed therein.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a substrate, a plurality of gate lines and a plurality of data lines on the substrate, a first insulation layer on the plurality of the gate lines, a plurality of gate link lines electrically connected to the gate lines, and a plurality of data link lines electrically connected to the data lines, the gate link lines and the data link lines being on the first insulation layer.

In another aspect, A method for fabricating a liquid crystal display device includes forming a plurality of gate lines on a substrate, forming a first insulation layer on the substrate over the gate lines, forming a plurality of data lines on the substrate, forming a plurality of gate link lines electrically connected to the gate lines, and forming a plurality of data link lines electrically connected to the data lines, the gate link lines and the data link lines formed on the first insulation layer.

In another aspect, a method for fabricating a liquid crystal display device includes forming a plurality of gate lines on a substrate, forming a gate insulation layer on the substrate over the gate lines, forming a plurality of data lines on the substrate, forming a plurality of gate link lines electrically connected to the gate lines, and forming a plurality of data link lines electrically connected to the data lines, the gate link lines and the data link lines formed on the gate insulation layer.

In another aspect, a liquid crystal display device includes a substrate; a plurality of gate lines, gate link lines and data link lines on the substrate; a first insulation layer on the substrate to cover the gate lines, the gate link lines and the data link lines; and a plurality of data lines on the first insulation layer, wherein the gate link lines and the data link lines are respectively connected to the gate lines and the data lines.

In another aspect, a liquid crystal display device includes a substrate; a plurality of gate lines and a plurality of data lines on the substrate; a first insulation layer on the plurality of the gate lines; a plurality of gate link lines electrically connected to the gate lines; a plurality of data link lines electrically connected to the data lines, the gate link lines and the data link lines being on the first insulation layer; and a driver integrated circuit applying signals to the gate lines and the data lines.

In another aspect, a method for fabricating a liquid crystal display device includes forming a plurality of gate lines, gate link lines and data link lines on a substrate; forming a first insulation layer on the substrate to cover the gate lines, the gate link lines and the data link lines; and forming a plurality of data lines on the first insulation layer, wherein the gate link lines and the data link lines are respectively connected to the gate lines and the data lines.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to preferred embodiments of the present invention, examples of which are illustrated in the accompanying drawings.

Figure 1:
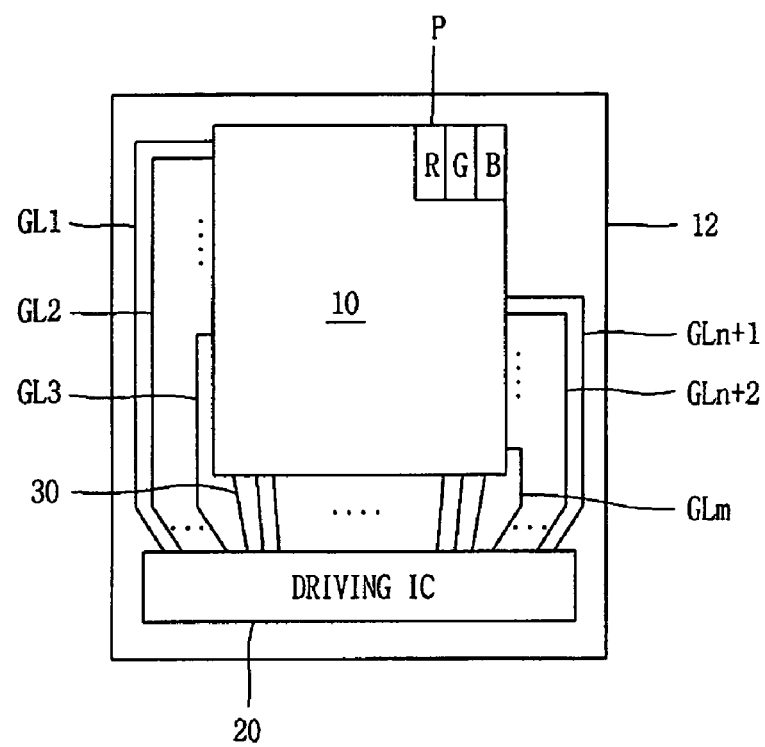
FIG. 1 is a plan view illustrating an LCD device according to the related art.
Figure 2:
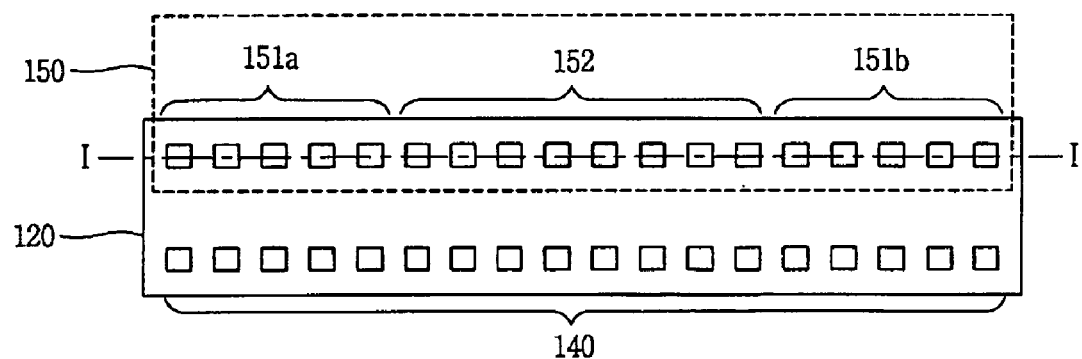
FIG. 2 is a plan view illustrating connections between a substrate and a driving IC according to the related art.
Figure 3:
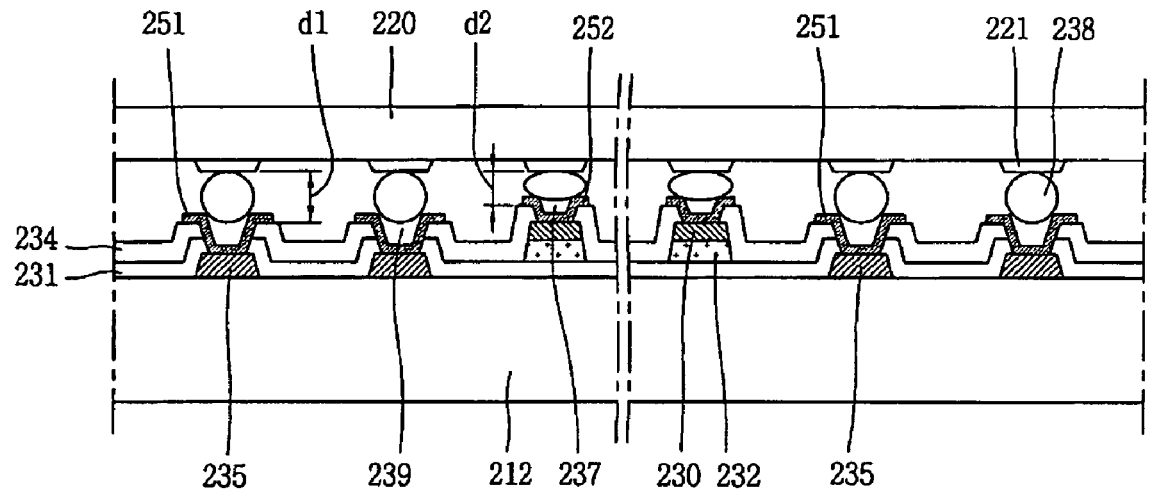
FIG. 3 is a cross-sectional view along I-I in FIG. 2.
Figure 4:
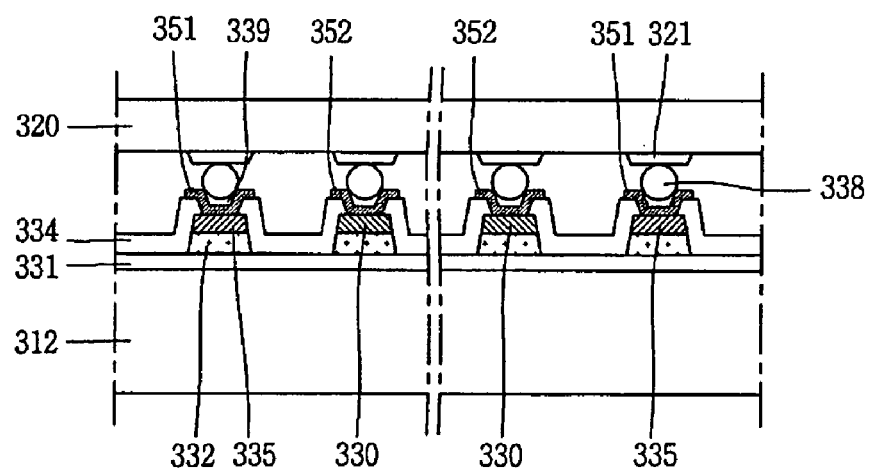
FIG. 4 is a cross-sectional view illustrating an LCD device according to an embodiment of the present invention.

FIG. 4 is a cross-sectional view illustrating an LCD device according to an embodiment of the present invention. In FIG. 4, an LCD device includes a substrate 312, a gate insulation layer 331, an active layer 332, a plurality of gate link lines 335 and a plurality of data link lines 330, a passivation layer 334, a gate bump 351, and a data bump 352.

Unlike the related art device in which the gate link lines are first formed on the substrate, the gate link lines 335 are formed on the gate insulation layer 331 after the gate insulation layer 331 is formed on the substrate 312. For example, the gate insulation layer 331 may be formed on the entire surface of the substrate 312 covering a gate electrode of a switching element and gate lines (not shown). The active layer 332 then is formed on the gate insulation layer 331. The active layer 332 may include an intrinsic amorphous silicon layer and an impurity/dopant-containing amorphous silicon layer.

Subsequently, a conductive material is deposited on the substrate 312 above the gate insulation layer 331. The deposited conductive material is patterned to form the gate link lines 335, the data link lines 330, and source/drain electrodes of the switching element (not shown). Since the conductive material is deposited during the same process, the gate link lines 351 and the data link lines 352 are formed with the same metal. Alternatively, the gate link lines 335, the data link lines 330, and source/drain electrodes of the switching element may include different materials from one another by respectively depositing and patterning different materials. The gate link lines 335 and the data link lines 330 may be formed on a corresponding one of the active layer 332.

In addition, an insulation material is deposited on the entire surface of the substrate 312 covering the gate insulation layer 221, the gate link lines 335 and the data link lines 330. Then, portions of the passivation layer 334 are etched to at least partially expose a portion of each of the gate link lines 335 and the data link lines 330. For example, a plurality of contact holes 339 are formed in the passivation layer 334 to expose a portion of each of the gate link lines 335 and the data link lines 330

Further, the gate bumps 351 and the data bumps 352 are formed in the contact holes 339. In particular, each of the gate bumps 351 electrically connects to a respective one of the gate link lines 335, and each of the data bumps 352 electrically connects to a respective one of the data link lines 330. The gate bumps 351 and the data bumps 352 are positioned to electrically contact directly with input/output (I/O) terminals 321 of a driving IC 320 mounted on the substrate 312. Further, the data bumps 352 may be positioned at the central portion of an lateral side of the substrate 312, and the gate bumps 351 may be position at side portions of the lateral side of the substrate 312.

Since the gate bumps 351 and the data bumps 352 are formed in the same process, there is no step formed, thereby provide a uniform distance between the I/O terminals 321 of the driving IC 320 and the bumps 351 and 352. As a result, the overall contact characteristics between the I/O terminals 321 of the driving IC 320 and the gate bumps 351 and the data bumps 352 are improved.

Figure 5A:
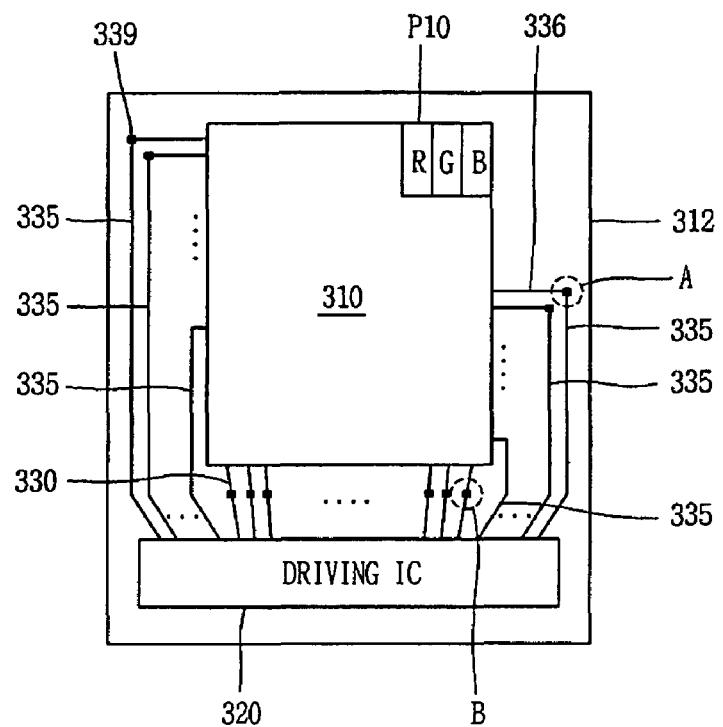
FIG. 5A is a plan view illustrating the LCD device shown in FIG. 4.
Figure 5B:
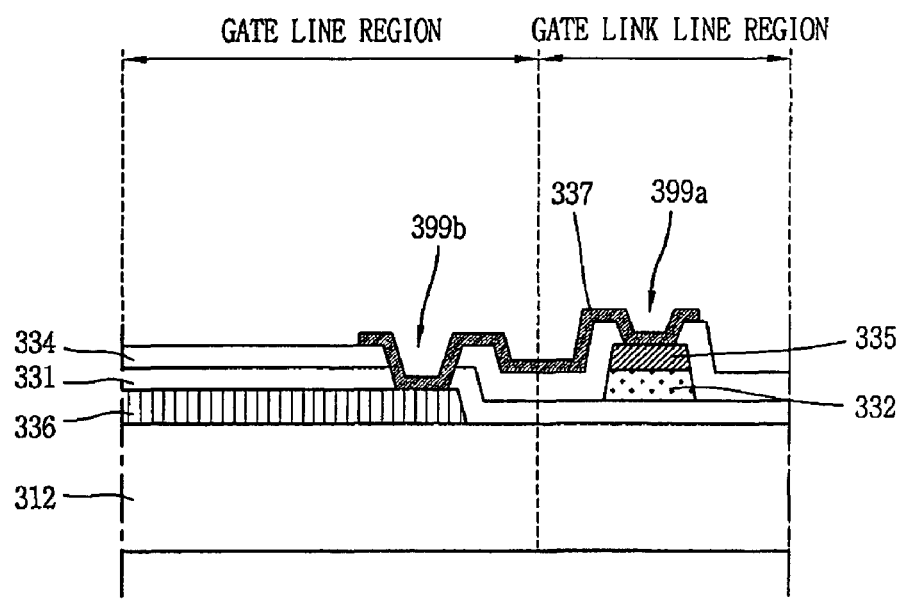
FIG. 5B is an enlarged cross-sectional view of region 'A' shown in FIG. 5A.

FIG. 5A is a plan view illustrating the LCD device shown in FIG. 4, and FIG. 5B is an enlarged cross-sectional view of region 'A' shown in FIG. 5A. In FIG. 5A, the LCD device includes an image display region 310. The image display region 310 includes a plurality of pixels P10, and each of the pixels P10 may include red, green and blue sub-color regions. In addition, the gate link lines 335 and the data link lines 330 are formed on the substrate 312. Although not shown, a plurality of data lines may be arranged in a vertical direction and a plurality of gate lines may be arranged in a horizontal direction in the image display region 310. The gate lines and the data lines intersect each other to define the pixels P10. The gate lines of the image display region 310 are respectively connected with the gate link lines 335 through the contact holes 339 (shown in FIG. 4), and the data lines are respectively connected with the data link lines 330 through the contact holes 339 (shown in FIG. 4).

In addition, the driving integrated circuit (IC) 320 is mounted on the substrate 312 outside the display region 310 and along a lateral edge of the substrate 312. The driving IC 320 applies data signals and scan signals to the pixels P10 through the gate link lines 332 and the data link lines 330.

Further, a first half of the gate link lines 335 may be on a left side portion of the image display region 310, and a second half of the gate link lines may be on a right side portion of the image display region 310. The first half of the gate link lines 335 may be connected to the gate lines located at a upper region of the image display region 310, and the second half of the gate link lines 335 may be connected to the gate lines located at a lower region of the image display region 310.

As shown in FIG. 5B, the LCD device includes a gate line region and a gate link line region. The gate line region is where the gate line 336 is formed and the gate link line region is where the gate link line 335 is formed. In particular, in the gate line region, the gate line 336 is formed on the substrate 312, on which the gate insulation layer 331 is formed. In the gate link line region, the gate insulation layer 331 is formed on the substrate 312, on which the active layer 332 and the gate link line 335 are sequentially formed. Thus, the gate link line 335 is formed in a different layer from the gate line 336.

In addition, the passivation layer 334 is formed in the gate line region and the gate link line region. The passivation layer 334 are partially etched to form first and second contact holes 399a and 399b, and a conductive pattern 337 is formed on the passivation layer 334 to electrically connect the gate line 336 and the gate link line 335 through the first and second contact holes 399a and 399b.

The conductive pattern 337 may include a non-transparent conductive material or a transparent conductive material, such as indium tin oxide (ITO), and may be formed simultaneously with formation of pixel electrodes in the image display region 310.

As stated above, the gate lines 336 and the gate link lines 335 are each formed in different fabrication process steps, and the gate link lines 335 and the data lines are formed during the same fabrication process step. Accordingly, it is preferred to form the gate link lines 335 with the same material as the data lines.

The active layer 332 under the gate link lines 335 and the data link lines 330 may be formed according to a masking process employed for forming a plurality of layers on the substrate 312, or may be omitted. For example, the gate link lines 335 may be directly formed on the gate insulation layer 331.

Figure 6A:
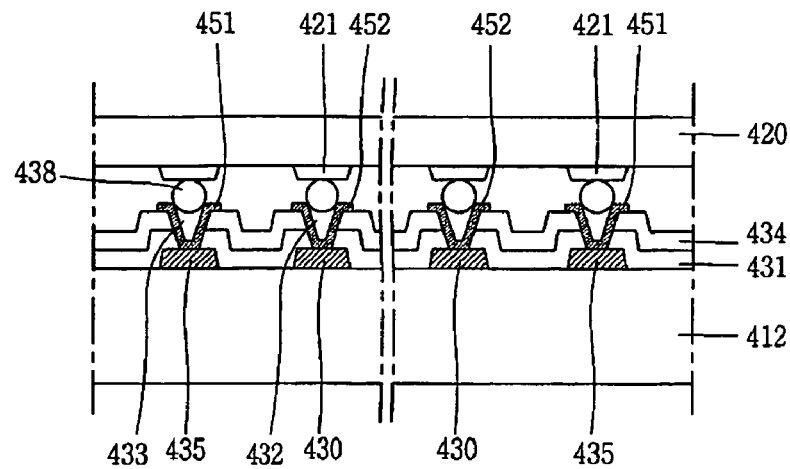
FIG. 6A is a cross-sectional view of exemplary gate and data bumps in an LCD device according to another embodiment of the present invention.
Figure 6B:
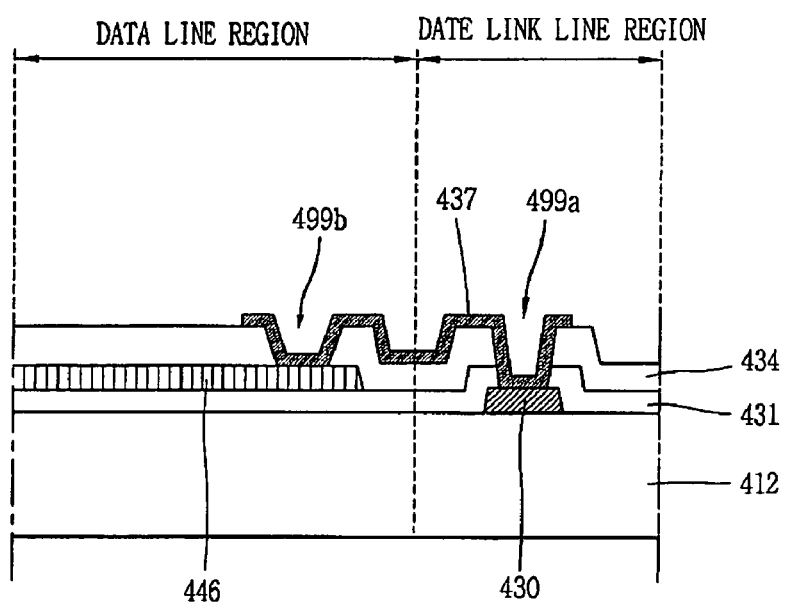
FIG. 6B is an enlarged cross-sectional view of portions of a data line and a data link line at region 'B' of FIG. 5A.

FIG. 6A is a cross-sectional view of exemplary gate and data bumps in an LCD device according to another embodiment of the present invention; and FIG. 6B is an enlarged cross-sectional view of portions of a data line and a data link line at region 'B' of FIG. 5A. As shown in FIG. 6A, data link lines 430 and gate link lines 435 are formed on a substrate 412. A gate insulation layer 431 and a passivation layer 434 are deposited on the data link lines 430 and the gate link lines 435. Contact holes 432 and 433 are formed in the gate insulating layer 431 and the passivation layer 434 to expose the data link lines 430 and the gate link lines 435. Gate bumps 451 and data bumps 452 are formed in the contact holes 432 and 433. The gate bumps 451 and the data bumps 452 are electrically connected to input/output terminals 421 of the driving IC 420 through conductive balls 438. Accordingly, in an embodiment of the present invention, the data link lines 430 and the gate link lines 435 are formed on the same layer, for example, on the substrate.

As shown in FIG. 6B, the LCD device includes a data line region and a data link line region. The data line 446 is formed on the gate insulation layer 431 in the data line region and the data link line 430 is formed on the substrate 412 in the data link line region. Thus, the data line 446 and the data link line 430 are formed on different layers. Although not shown, an active layer may be formed under the data line 446. First contact holes 499a are formed in the data link line region through the gate insulation layer 431 and the passivation layer 434 to expose the data link lines 430. Second contact holes 499b are formed in the data line region through the passivation layer 434 to expose the data line 446. A conductive pattern 437 is formed on the passivation layer 434 to electrically connect the data line 336 and the data link line 430 through the first and second contact holes 499a and 499b.

Accordingly, the LCD device and the fabrication method thereof, in accordance with an embodiment of the present invention, have the advantage that the contact surface of the substrate on which the driving IC is to be mounted is planarized, to thereby prevent the contact deficiency and prevent driving deficiency of the LCD device.

It will be apparent to those skilled in the art that various modifications and variations can be made in the liquid crystal display (LCD) device and the fabrication method thereof of the present invention without departing from the spirit or scope of the invention. Thus, it is intended that the present invention covers the modifications and variations of this invention provided they come within the scope of the appended claims and their equivalents.

What is claimed is:

1. A liquid crystal display device, comprising:
   a substrate;
   a driving IC on the substrate, the driving IC including first input/output terminals at the central region thereof and second input/output terminals at the side regions thereof;
   a plurality of gate lines, gate link lines and data link lines on the substrate;
   a first insulation layer on the substrate to cover the gate lines, the gate link lines and the data link lines;
   a plurality of data lines on the first insulation layer;
   a second insulation layer on the first insulation layer and covering the data lines;
   a plurality of first contact holes in the first and second insulation layers, each of the first contact holes partially exposing a respective one of the gate link lines and the data link lines;
   a conductive bump in one of the first contact holes on each of the gate link lines and each of the data link lines;
   a conductive ball on the bump, the conductive ball electrically connecting the bump to an input/output terminal of a driver integrated circuit;
   a plurality of second contact holes in the second insulation layer, each of the second contact holes exposing a portion of a respective one of the data lines;
   a plurality of third contact holes in the first and second insulation layers, each of the third contact holes exposing a portion of a respective one of the data link lines; and
   a conductive pattern on the second insulation layer, the conductive pattern electrically connecting one of the data lines to a respective one of data link lines via the second and third contact holes,
   wherein the data link lines are connected to the first input/output terminals of the driver IC, the gate link lines are connected to the second input/output terminals of the driver IC, and the gate link lines are connected to the gate lines through only one conductive path, and
   wherein the data lines are apart from the data link lines in a distance so that the data lines and the data link lines are not overlapped.

2. The device of claim 1, wherein the bump includes a transparent conductive material.

3. The device of claim 1, wherein the gate lines, the gate link lines and the data link lines are formed during the same process step.

4. A method for fabricating a liquid crystal display device, comprising:
   forming a plurality of gate lines, gate link lines and data link lines on a substrate;
   forming a first insulation layer on the substrate to cover the gate lines, the gate link lines and the data link lines;
   forming a plurality of data lines on the first insulation layer;
   forming a second insulation layer over the substrate;
   forming first contact holes in the first and second insulation layers partially exposing the gate link lines and the data link lines;
   forming a bump at each of the first contact holes on each of the gate link lines and each of the data link lines;
   forming a plurality of second contact holes in the second insulation layer, each of the second contact holes exposing a portion of a respective one of the data lines;
   forming a plurality of third contact holes in the first and second insulation layers, each of the third contact holes exposing a portion of a respective one of the data link lines;
   forming a conductive pattern on the second insulation layer, the conductive pattern electrically connecting one of the data lines to a respective one of data link lines via the second and third contact holes;
   forming a conductive ball on the bump, the conductive ball electrically connecting the bump to an input/output terminal of a driver integrated circuit;
   mounting a driving IC on the substrate, the driving IC including first input/output terminals at the central region thereof and second input/output terminals at the side regions thereof; and
   connecting each of the bumps with a respective one of the input/output terminals,
   wherein the data link lines are connected to the first input/output terminals of the driver IC, the gate link lines are connected to the second input/output terminals of the driver IC, and the gate link lines are connected to the gate lines through only one conductive path, and
   wherein the data lines are apart from the data link lines in a distance so that the data lines and the data link lines are not overlapped.

5. The method of claim 4, wherein the forming the bump includes depositing and patterning a transparent conductive material.

6. The method of claim 5, wherein the patterning the deposited conductive material includes forming a pixel electrode on the substrate.

7. The method of claim 4, wherein the mounting the driving IC includes positioning a conductive ball between each of the bumps and the driving IC.

8. The method of claim 4, wherein the gate link lines and the data link lines are formed during the same process step.

* * * * *